(12) United States Patent
Liu et al.

(10) Patent No.: US 8,935,482 B2
(45) Date of Patent: *Jan. 13, 2015

(54) METHOD, SYSTEM AND SERVER OF REMOVING A DISTRIBUTED CACHING OBJECT

(71) Applicant: Alibaba Group Holding Limited, Grand Cayman (KY)

(72) Inventors: Gang Liu, Hangzhou (CN); Qing Ren, Hangzhou (CN); Wensong Zhang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/468,774

(22) Filed: Aug. 26, 2014

(65) Prior Publication Data

US 2014/0365600 A1  Dec. 11, 2014

Related U.S. Application Data

(63) Continuation of application No. 14/266,549, filed on Apr. 30, 2014, now Pat. No. 8,838,904, which is a continuation of application No. 13/320,509, filed as application No. PCT/US2011/048832 on Aug. 23, 2011, now Pat. No. 8,769,208.

(30) Foreign Application Priority Data

Aug. 26, 2010 (CN) .......................... 2010 1 0268800

(51) Int. Cl.
*G06F 12/00* (2006.01)
*H04L 29/08* (2006.01)

(52) U.S. Cl.
CPC .................................. *H04L 67/2842* (2013.01)
USPC ................... 711/133; 715/745; 711/E12.069; 707/689; 707/663

(58) Field of Classification Search
USPC .......................................... 711/133; 715/745
See application file for complete search history.

(56) References Cited

U.S. PATENT DOCUMENTS 6,154,811 A  11/2000  Srbljic et al.
6,449,695 B1  9/2002  Bereznyi et al.
(Continued)

OTHER PUBLICATIONS

The Extended European Search Report mailed Feb. 26, 2014 for European Patent Application No. 11820536.8, 6 pages.
(Continued)

*Primary Examiner* — Yaima Rigol
*Assistant Examiner* — Hamdy S Ahmed
(74) *Attorney, Agent, or Firm* — Lee & Hayes, PLLC

(57) ABSTRACT

The present disclosure discloses a method, a system and a server of removing a distributed caching object. In one embodiment, the method receives a removal request, where the removal request includes an identifier of an object. The method may further apply consistent Hashing to the identifier of the object to obtain a Hash result value of the identifier, locates a corresponding cache server based on the Hash result value and renders the corresponding cache server to be a present cache server. In some embodiments, the method determines whether the present cache server is in an active status and has an active period greater than an expiration period associated with the object. Additionally, in response to determining that the present cache server is in an active status and has an active period greater than the expiration period associated with the object, the method removes the object from the present cache server. By comparing an active period of a located cache server with an expiration period associated with an object, the exemplary embodiments precisely locate a cache server that includes the object to be removed and perform a removal operation, thus saving the other cache servers from wasting resources to perform removal operations and hence improving the overall performance of the distributed cache system.

20 Claims, 10 Drawing Sheets

(56) References Cited

U.S. PATENT DOCUMENTS

| | | |
|---|---|---|
| 6,601,090 B1 * | 7/2003 | Gurijala et al. ............... 709/213 |
| 6,658,487 B1 | 12/2003 | Smith |
| 6,999,988 B2 | 2/2006 | Buddhikot et al. |
| 7,062,541 B1 | 6/2006 | Cannon et al. |
| 7,469,256 B1 | 12/2008 | Manolov et al. |
| 7,657,548 B2 | 2/2010 | Seiler et al. |
| 7,802,065 B1 | 9/2010 | Eatough |
| 8,504,775 B2 | 8/2013 | Plamondon |
| 2008/0034165 A1 | 2/2008 | Iyengar et al. |
| 2008/0235292 A1 | 9/2008 | Janin et al. |
| 2009/0083115 A1 | 3/2009 | Pearson et al. |
| 2009/0313438 A1 | 12/2009 | Krishnaprasad et al. |
| 2010/0088398 A1 | 4/2010 | Plamondon |
| 2010/0180208 A1 | 7/2010 | Kasten et al. |
| 2011/0191541 A1 | 8/2011 | Lowry et al. |
| 2011/0196831 A1 | 8/2011 | Zunger et al. |
| 2014/0237068 A1 | 8/2014 | Liu et al. |

OTHER PUBLICATIONS

Office Action for U.S. Appl. No. 13/320,509, mailed on Jan. 17, 2014, Gang Liu, "Method, System and Server of Removing a Distributed Caching Object," 5 pages.

The PCT Search Report and written opinion mailed Jan. 10, 2012 for PCT application No. PCT/US11/48832, 9 pages.

* cited by examiner

METHOD, SYSTEM AND SERVER OF REMOVING A DISTRIBUTED CACHING OBJECT

CROSS REFERENCE TO RELATED PATENT APPLICATIONS

This application is a continuation of, and claims the benefit of, U.S. patent application Ser. No. 14/266,549, filed Apr. 30, 2014, which is a continuation of application Ser. No. 13/320, 509, filed Nov. 14, 2011, entitled "Method, System and Server of Removing a Distributed Caching Object," which is a national stage application of an international patent application PCT/US11/48832, filed Aug. 23, 2011, which claims priority to Chinese Patent Application No. 201010268800.3, filed on Aug. 26, 2010, entitled "Method, System and Removal Server of Removing a Distributed Caching Object," which applications are hereby incorporated in their entirety by reference.

TECHNICAL FIELD

The present disclosure relates to the field of network technology, and particularly, relates to methods, systems and servers of removing a distributed caching object.

BACKGROUND OF THE PRESENT DISCLOSURE

A large-scale website system usually stores and retrieves data through a distributed cache structure. For example, the taobao website (i.e., tabao.com) stores and retrieves images uploaded by users through a distributed cache structure. Normally, a distributed cache system includes a source data server, multiple cache servers which communicate with the source data server, and a dispatcher. Responsive to a user's request, the distributed cache system generally uses the dispatcher to determine which cache server the user may obtain data through a consistent Hashing algorithm that is based on the received user's request. If the cache server so determined has the data, the determined cache server returns the data to the dispatcher. If the determined cache server does not have the data, the determined cache server requests the data from the source data server, stores the data therein, and returns the data to the dispatcher which returns the data to the user.

In an existing distributed cache system such as an image system of taobao website, when a seller uploads a malicious image (e.g., an infringing image or an illegal image), the image is first uploaded to a source image server. When a network user accesses the malicious image through a link of taobao network, he/she first accesses a certain image cache server that is determined based on the consistent Hashing algorithm. If that image cache server does not have the malicious image, the image cache server obtains the malicious image from the source image server and stores the malicious image. When the existence of this malicious image is detected, the system will need to remove this malicious image. Existing technology performs removal operations for that malicious image in the source image server and all the image cache servers of the distributed cache system.

During the study of the existing technology, inventors of this application have noted that the removal operation of the existing technology greatly increases the burden of servers and wastes resources of the servers because all the servers need to perform such a removal operation, though not all the cache servers have malicious data. This is especially true for a system including a large number of cache servers. Since the removal operation is needlessly performed in cache servers that have no malicious data, the overall performance of the distributed cache system is reduced.

SUMMARY OF THE DISCLOSURE

Exemplary embodiments of the present disclosure aim to provide methods, systems and servers of removing a distributed caching object in order to solve the problem that exists in existing technology which requires to perform removal operations in all distributed cache servers and hence wastes resources of the servers and reduces the overall system performance.

In order to solve the aforementioned problem, the exemplary embodiments provide a method of removing a distributed caching object, which is implemented as follows.

In one embodiment, the method of removing a distributed caching object may include receiving a removal request. The removal request may include an identifier of an object. The method may apply consistent Hashing, for example, to the identifier of the object to obtain a Hash result value of the identifier. Based on the Hash result value, the method may locate a corresponding cache server. In one embodiment, the method may render the corresponding cache server to be a present cache server. In some embodiments, the method may determine whether the present cache server is in an active status and has an active period greater or longer than an expiration period associated with the object. In response to determining that the present cache server is in an active status and has an active period longer than the expiration period associated with the object, the method may remove the object from the present cache server.

In order to solve the aforementioned problem, the exemplary embodiments further provide a system of removing a distributed caching object, which is implemented as follows.

In one embodiment, the system of removing a distributed cache object may include a removal server and multiple cache servers. The multiple cache servers may be configured to cache objects that are accessed by users. In some embodiments, the removal server may be configured to receive a removal request. The removal request may include an identifier of an object. In one embodiment, the removal server may further be configured to apply consistent Hashing to the identifier of the object to obtain a Hash result value of the identifier. The removal server may locate a corresponding cache server based on the Hash result value and render the corresponding cache server to be a present cache server. Additionally, in some embodiments, the removal server may determine whether the present cache server is in an active status and has an active period greater than an expiration period associated with the object. In response to determining that the present cache server is in an active status and has an active period greater than the expiration period associated with the object, the removal server may remove the object from the present cache server.

In order to solve the aforementioned problem, the exemplary embodiments provide a removal server, which is implemented as follows.

In one embodiment, the removal server may include a receiving unit. The receiving unit may be configured to receive a removal request, where the removal request may include an identifier of an object. Additionally, the removal server may further include a computation unit that is configured to apply consistent Hashing to the identifier of the object to obtain a Hash result value of the identifier. In some embodiments, the removal server may further include a locating unit which is configured to locate a corresponding cache server based on the Hash result value and render the corresponding cache server to be a present cache server. In one embodiment, the removal server may include a determination unit configured to determine whether the present cache server is in an active status and has an active period greater than an expiration period associated with the object. Additionally, the removal server may further include a removal unit configured to remove the object from the present cache server in response to determining that the present cache server is in an active status and has an active period greater than the expiration period associated with the object.

The exemplary embodiments of the present disclosure receive a removal request which includes an identifier of an object, apply consistent Hashing to the identifier of the object to obtain a Hash result value of the identifier, locate a corresponding cache server based on the Hash result value, render the corresponding cache server to be a present cache server, determine whether the present cache server is in an active status and has an active period greater than an expiration period associated with the object, and remove the object from the present cache server in response to determining that the present cache server is in an active status and has an active period greater than the expiration period associated with the object. The exemplary embodiments of the present disclosure therefore do not need to perform removal operations in all cache servers. Instead, by comparing an active period of a located cache server with an expiration period associated with an object, the exemplary embodiments precisely locate a cache server that includes the object to be removed and perform a removal operation, thus saving the other cache servers from wasting resources to perform removal operations and hence improving the overall performance of the distributed cache system.

BRIEF DESCRIPTION OF THE DRAWINGS

In order to more clearly understand the technical scheme of the exemplary embodiments of the present disclosure or existing technologies, accompanying figures that are essential for explaining the exemplary embodiments or existing technologies are briefly described below. Understandably, the following figures only constitute a few exemplary embodiments of the present disclosure. Based on these accompanying figures, one skilled in the art can obtain other figures without making any creative effort.

DETAILED DESCRIPTION

The exemplary embodiments of the present disclosure provide methods, systems and servers of removing a distributed caching object.

In order to facilitate one skilled in the art to clearly understand the technical scheme, goals, characteristics and advantages of the exemplary embodiments, the technical scheme in the exemplary embodiments will be described in further detail with reference to the accompanying figures of the exemplary embodiments.

In the exemplary embodiments, an object removed in a distributed cache system is an object that has been stored in a distributed cache server of the system. Therefore, how an existing system stores and retrieves an object in a distributed cache server is described first with reference to the consistent Hashing algorithm.

Figure 1:
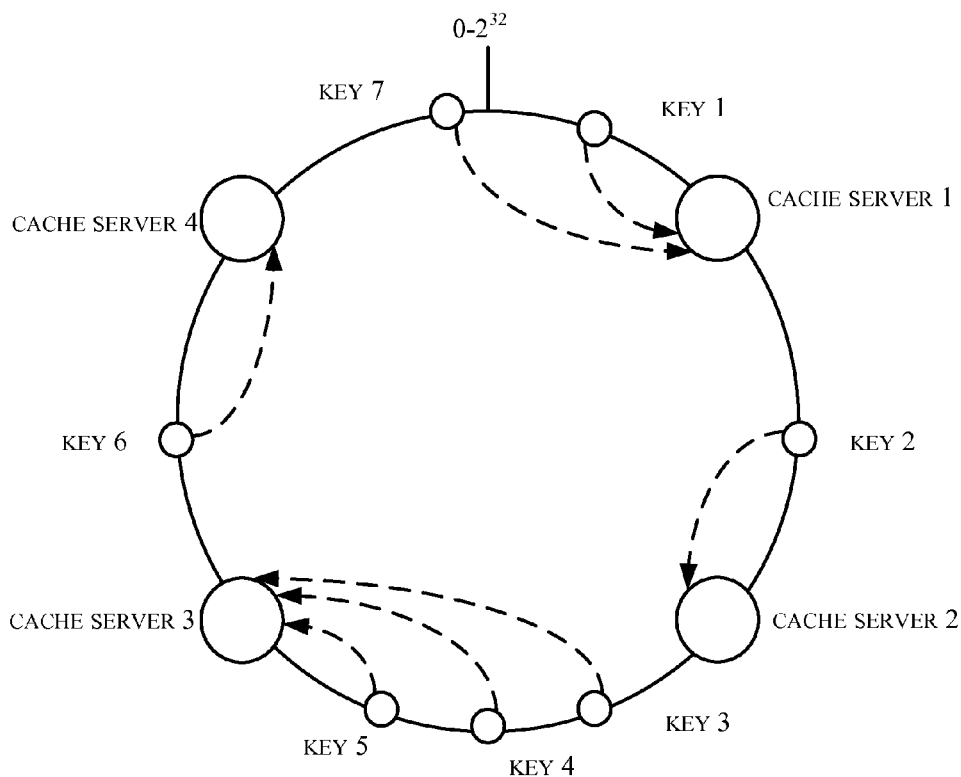
FIG. 1 shows a schematic diagram illustrating a consistent Hashing ring in accordance with an embodiment of the present disclosure.

In a distributed cache system, cache servers are arranged in a 0-232 ring based on respective Hash values computed from the consistent Hashing algorithm. When a Hash value of a cache server is computed, the Hash value is obtained by applying a selected Hash function to an IP address of the cache server. The Hash value is a 32-digit integer. The cache server is mapped correspondingly onto a position in the ring based on the value of the integer. FIG. 1 shows an example of a $0-2^{32}$ ring. Let a distributed cache system include four cache servers. Upon applying consistent Hashing, the four cache servers, namely, cache server 1, cache server 2, cache server 3 and cache server 4 which are arranged in a clockwise direction, are mapped onto the ring based on respective Hash values as shown in FIG. 1. When a user wants to access a certain object (which may be a network resource such as an image, audio or video, for example) through a distributed cache server, a Hash calculation is applied to the object (generally, applying a Hash calculation to an identifier of the object, URL). The obtained Hash value is used as a key and is mapped correspondingly onto a position in the $0-2^{32}$ ring based on the value of the key. The position of the key is used as an initial position to find a first cache server on the ring in a clockwise direction. The user accesses the object through the first cache server so found. If the first cache server that is found through this clockwise search is unavailable (for example, down or crashed), the clockwise search continues until an available cache server is found. If the object which the user wants to access exists in that available cache server, the object is returned to the user through a dispatcher. If the object which the user wants to access does not exist in that available cache server, that cache server requests the object from a source data server, stores the object therein, and returns the object to the dispatcher which returns the object to the user.

Each object stored in a cache server has an expiration period. When an object is cached longer than its expiration period, the cache server removes the object automatically. Thereafter, if a user wants to access the object again through the cache server, the cache server may obtain the object from the source data server again and repeat the aforementioned process.

Figure 2:
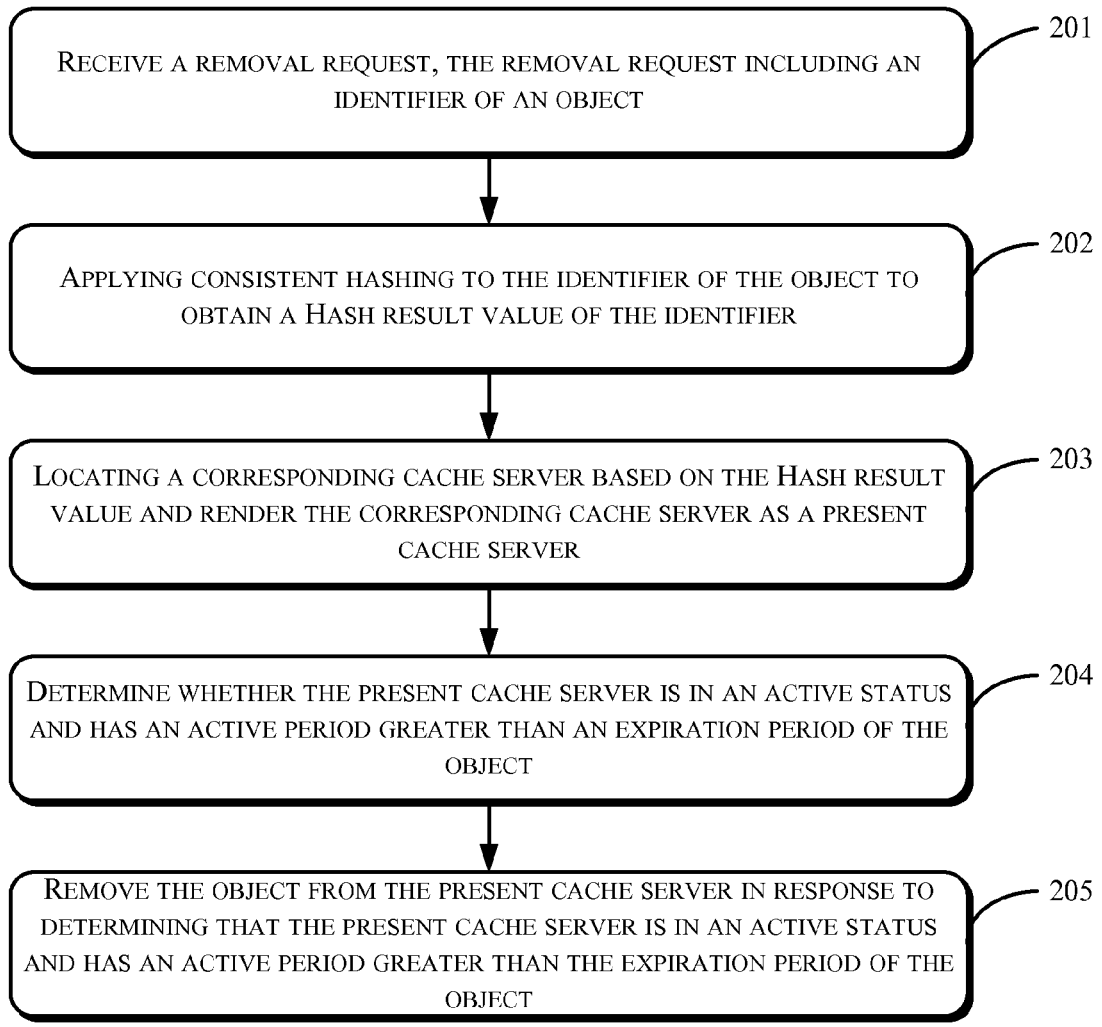
FIG. 2 shows a flowchart illustrating a first exemplary method of removing a distributed caching object.

FIG. 2 shows a flowchart illustrating a first exemplary method of removing a distributed caching object. This embodiment shows a process of removing an object when an active period of a located cache server is greater than an expiration period of the object.

At 201, the method receives a removal request. The removal request includes an identifier of an object to be removed. When a distributed cache system is employed in a large-scale website, the object refers to a network resource such as an image, audio, video, etc. Each particular network resource is positioned through a URL (Universal Resource Locator).

At 202, the method applies Hashing to the identifier of the object to obtain a Hash result value of the identifier. In one implementation, this block corresponds to a process of applying consistent Hashing to an identifier of an object to obtain a Hash result value. The Hashing is consistent with a computation process that is implemented in existing technologies for storing and retrieving an object. This block therefore is not redundantly described herein.

At 203, the method locates a corresponding cache server based on the Hash result value and renders the corresponding cache server to be a present cache server.

Referring to the consistent Hashing ring shown in FIG. 1, after applying consistent Hashing to the identifier of the object and obtaining a Hash result value, the Hash result value may be used as a key to be mapped onto a corresponding position of the consistent Hashing ring, and a search may be performed in a clockwise direction to find a first cache server, starting from that position. Because the first cache server so found is the cache server that was dispatched when a user accessed the object, the first cache server has cached the object to be removed (given that the first cache server is in an active status, the object has been accessed by a user and an expiration period of the object has not been exceeded yet).

At 204, the method determines whether the present cache server is in an active status and has an active period greater than an expiration period of the object.

At 205, the method removes the object from the present cache server in response to determining that the present cache server is in an active status and has an active period greater than the expiration period of the object.

An active period refers to a time duration during which the cache server is in an active status. When the located first cache server is in an active status and has an active period greater than the expiration period of the object, an operation of removing the URL needs to be performed only in the located first cache server. It is because this cache server is presently active and all requests for accessing the object have been sent to this cache server. Even if the object exists in other cache servers, the object is automatically removed as the time duration of the object exceeds the expiration period of the object.

Figure 3:
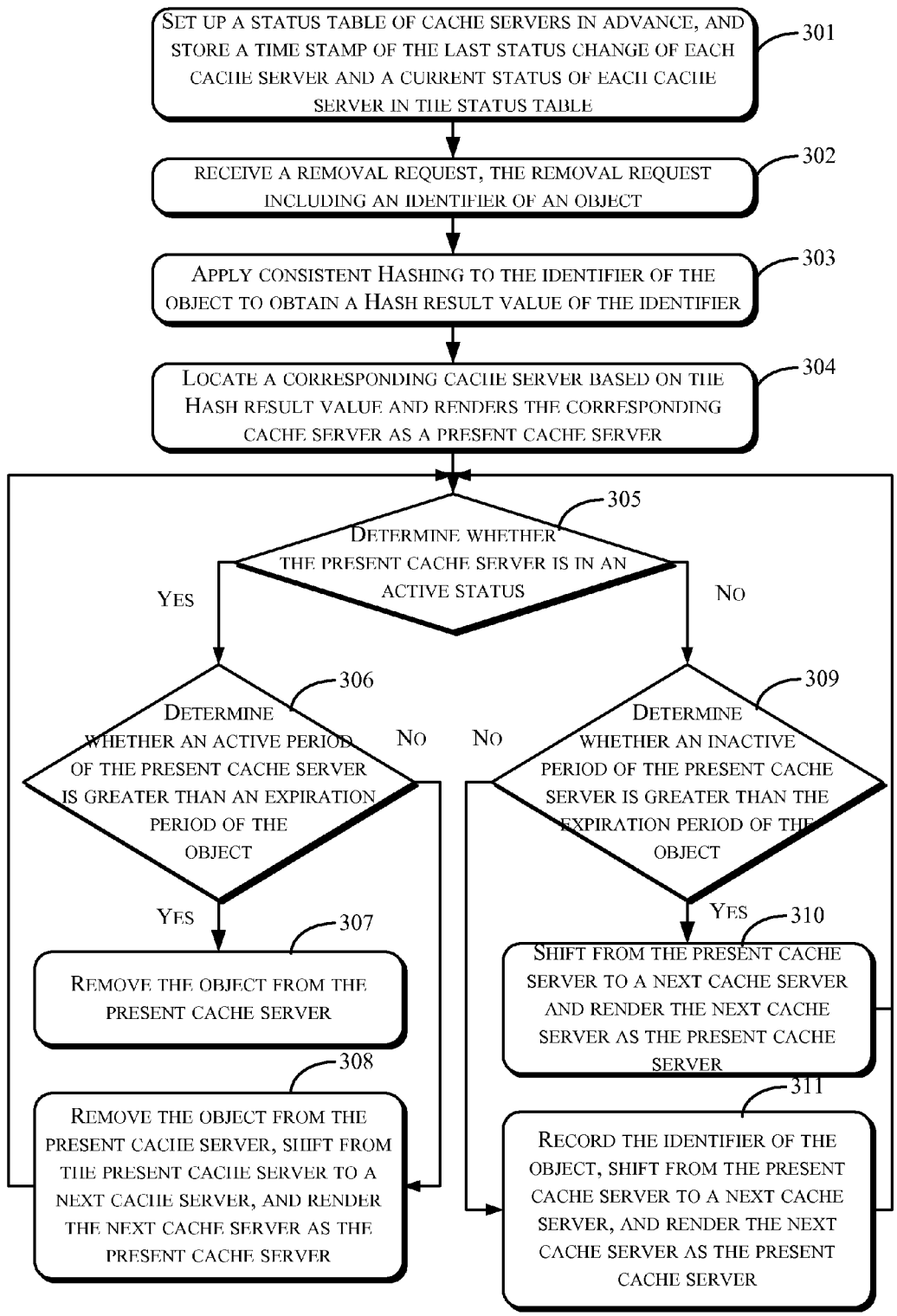
FIG. 3 shows a flowchart illustrating a second exemplary method of removing a distributed caching object.

FIG. 3 shows a flowchart illustrating a second exemplary method of removing a distributed cache object. This embodiment shows in detail about a process of removing an object based on an active status and a status history of a located cache server.

At 301, the method sets up a status table of cache servers in advance, and stores a time stamp of the last status change of each cache server and a current status of each cache server in the status table.

This exemplary embodiment sets up a status table for cache servers. Each entry of the status table is used for recording a time stamp of the last status change of a cache server and a current status of the cache server. A time duration for the current status of the cache server may be determined based on this time stamp. A current status may include an active status or an inactive status, with the inactive status usually indicating that the cache server is down.

At 302, the method receives a removal request, where the removal request includes an identifier of an object.

At 303, the method applies consistent Hashing to the identifier of the object to obtain a Hash result value of the identifier.

At 304, the method locates a corresponding cache server based on the Hash result value and renders the corresponding cache server as a present cache server.

At 305, the method determines whether the present cache server is in an active status. If affirmative, the method goes to block 306; otherwise the method goes to block 309.

At 306, the method determines whether an active period of the present cache server is greater than an expiration period of the object. If affirmative, the method goes to block 307; otherwise the method goes to block 308.

At 307, the method removes the object from the present cache server and ends the present process.

If the present cache server that is found from the status table is in an active status and has an active period greater than an expiration period of the object, an operation of removing the URL needs to be performed only in the located first cache server. It is because that cache server is presently active and all requests for accessing the object have been sent to that cache server. Even if the object exists in other cache servers, the object is automatically removed as the time duration of the object exceeds the expiration period of the object.

At 308, the method removes the object from the present cache server, shifts from the present cache server to a next cache server, and renders the next cache server as the present cache server. The process returns to block 305.

If the present cache server that is found from the status table is in an active status and has an active period determined to be less or shorter than the expiration period of the object based on corresponding time stamp, the object is removed from the cache server first. Thereafter, upon consideration that the cache server was in an inactive status prior to the active status and a request for accessing the object to be removed may have been transferred to a next cache server (which is next to the present cache server on the consistent Hashing ring) during the time when the present cache server was in an inactive status, the next cache server may have cached that object and is therefore needed to be obtained and rendered as the present cache server for determining corresponding status again. The method returns to block 305.

At 309, the method determines whether an inactive period of the present cache server is greater than the expiration period of the object. If affirmative, the method goes to block 310; otherwise the method goes to block 311.

At 310, the method shifts from the present cache server to a next cache server and renders the next cache server as the present cache server. The method returns to block 305.

If the present cache server that is found from the status table is in an inactive status and has an inactive period determined to be greater than the expiration period of the object based on corresponding time stamp, a request for accessing the object to be removed may have been transferred to a next cache server (which is next to the present cache server on the consistent Hashing ring) during the time when the present cache server was in an inactive status, and the next cache server may have cached that object. The next cache server is therefore needed to be obtained and rendered as the present cache server for determining corresponding status again. The method returns to block 305.

For a cache server having an inactive period greater than the expiration period of the object, the cache server will automatically perform a removal operation for the object after the cache server recovers to an active status because the expiration period of the object has been exceeded.

At 311, the method records the identifier of the object, shifts from the present cache server to a next cache server, and renders the next cache server as the present cache server. The method returns to block 305.

If the present cache server that is found from the status table is in an inactive status and has an inactive period determined to be less than the expiration period of the object based on corresponding time stamp, a request for accessing the object to be removed may have been transferred to a next cache server (which is next to the present cache server on the consistent Hashing ring) during the time when the present cache server was in an inactive status, and the next cache server may have cached that object. The next cache server is therefore needed to be obtained and rendered as the present cache server for determining corresponding status again. The method returns to block 305.

For a cache server having an inactive period less than the expiration period of the object, the cache server needs to record the identifier of the object to be removed so that the cache server may remove the object based on the recorded identifier if the cache server recovers to an active status prior to the expiration period of the object.

Figure 4:
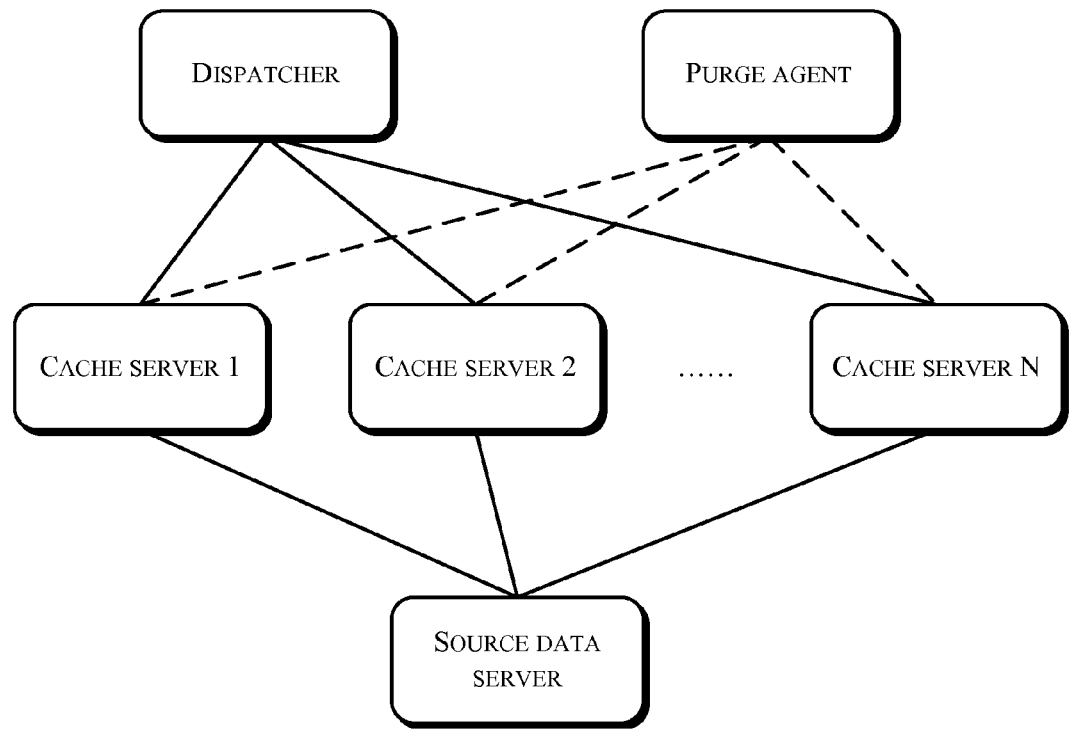
FIG. 4 shows a diagram illustrating a system structure implementing the exemplary method of removing a distributed caching object.

FIG. 4 shows a diagram illustrating a system structure that implements the exemplary method of removing a distributed caching object. The system structure includes a source data server, N number of cache servers (where N is a positive integer), a dispatcher and a purge agent. The purge agent is a server that is added for implementing the removal of a distributed caching object in the present embodiment while the source data server, the cache servers and the dispatcher implement the existing approach of storing and retrieving data in a distributed cache system.

The dispatcher (also known as a load balancer "haproxy") receives a request for accessing an object from a user, and dispatches the request to a certain cache server based on the consistent Hashing algorithm. As the dispatch process is the same as the existing technology, the dispatch process is not redundantly described herein.

The cache server (which can be implemented by loading an open-source cache service program "squid" on an associated server) receives the request dispatched from the dispatcher, and returns the object (which the user wants to access) from therein or obtains and returns the object (which the user wants to access) from the source data server.

The purge agent is a server that is added to the exemplary system structure, and uses the same consistent Hashing algorithm of the dispatcher to implement the removal of a caching object. The purge agent may be an independent server, or may be integrated in a certain cache server which performs the removal function. The purge agent may communicate with all cache servers in the system. A request for removing an object from the system is transmitted to the purge agent. For example, when a malicious image is detected and needs to be removed, or when an image of a product needs to be removed because the product is not for sale anymore, a removal request including an identifier of an object to be removed (e.g., a link address of the a malicious image) is sent to the purge agent. The purge agent may further maintain a status table which includes status information of all cache servers. The status table records two pieces of information of each cache server. One piece of information is a time stamp of the last status change of a cache server (based on the time stamp, a time duration since the last status change of the cache server occurs may be calculated), and the other piece of information is a current status of the cache server. The current status may be used to determine whether the cache server is presently active or down.

Figure 5:
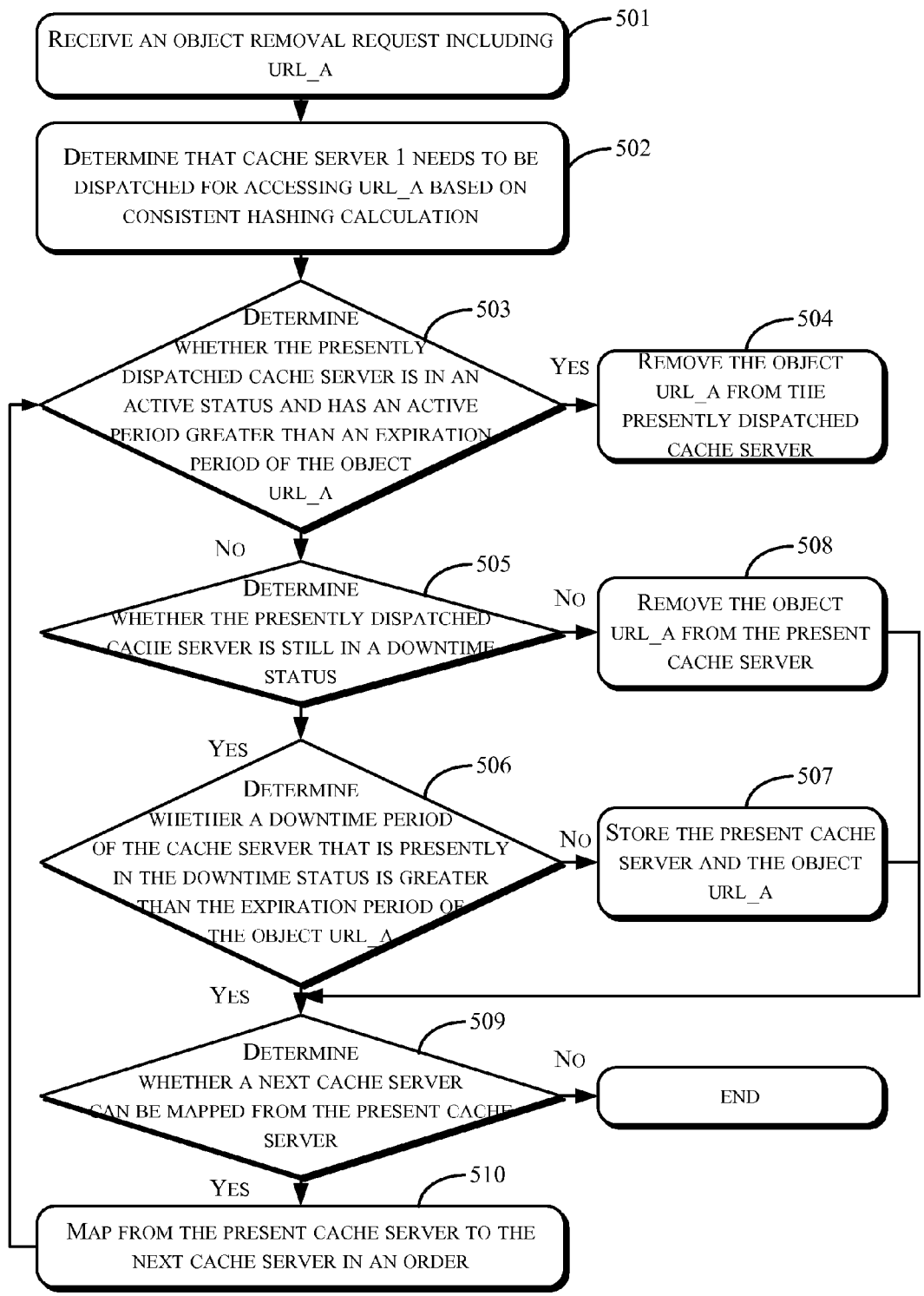
FIG. 5 shows a process of removing an object using the system structure described in FIG. 4.

Let url_a be an identifier of an object to be removed. A removal process of this embodiment is described with reference to the consistent Hashing ring shown in FIG. 1. url_a represents a network resource and usually is a link address of the object. Upon determining to remove url_a, the object is first removed from the source data server, and url_a that exists in the cache server is removed subsequently. Upon applying consistent Hashing to url_a, a determination is made to first map to cache server 1 of the consistent Hashing ring for accessing url_a and the status table is checked. Corresponding process is shown in FIG. 5.

At 501, the process receives a removal request which includes url_a.

At 502, the process determines that cache server 1 needs to be dispatched for accessing url_a based on consistent Hashing.

At 503 the process determines whether the presently dispatched cache server is in an active status and has an active period greater than an expiration period of the object url_a. If affirmative, the process goes to block 504; otherwise the process goes to block 505.

At 504, the process removes the object url_a from the presently dispatched cache server and ends the present process.

If the current status of the found cache server 1 is "active" and an active period of cache server 1 is determined to be greater than the expiration period of url_a based on its time stamp, all requests for accessing url_a have been sent to cache server 1 because cache server 1 is presently active, regardless of whether cache server 1 has been down or not. Furthermore, even if url_a exists in other cache servers, url_a is automatically removed as its time of existence exceeds the expiration period of url_a. Accordingly, an operation of removing url_a needs to be performed in cache server 1 only.

At 505, the process determines whether the presently dispatched cache server is still down. If affirmative, the process goes to block 506; otherwise the process goes to block 508.

At 506, the process determines whether a downtime period of the cache server that is currently down is greater than the expiration period of the object url_a. If affirmative, the process goes to block 509; otherwise the process goes to block 507.

If the current status of the found cache server 1 is "down" and its downtime period is determined to be greater than the expiration period of the object url_a based on its time stamp, the access of the object url_a may have been shifted to any one of cache servers 2-4 during the time when cache server 1 was down. Accordingly, a cache server that is next in an order needs to be obtained, and blocks, starting from block 503, are repeated for that cache server. For cache server 1, since the expiration period of the object url_a will be past once cache server 1 returns back to an active status, cache server 1 will automatically perform the removal of operation for the object url_a.

At 507, the process stores the present cache server and the object url_a. The process continues to block 509.

If the current status of the found cache server 1 is "down" and its downtime period is determined to be less than the expiration period of the object url_a based on its time stamp, the access of the object url_a may have been shifted to any one of cache servers 2-4 during the time when cache server 1 was down. Accordingly, a cache server that is next in an order needs to be obtained, and blocks, starting from block 503, are repeated for that cache server. Since the downtime period of cache server 1 is less than the expiration period of the object url_a, the object url_a needs to be recorded so that cache server 1 may remove the object url_a based on this record if cache server 1 recovers to an active status prior to the expiration period of the object url_a.

The relationship between the present cache server 1 and the object url_a may be stored in a deferred removal list. If cache server 1 recovers to an active status prior to the expiration period of the object url_a, the object url_a may be removed from cache server 1 based on an entry recorded in the deferred removal list.

At 508, the process removes the object url_a from the present cache server. If the current status of the found cache server 1 is "active" and its active period is determined to be less than the expiration period of the object's url_a based on corresponding time stamp, url_a is removed from cache server 1 first. Thereafter, upon consideration that cache server 1 was in a "down" status prior to the "active" status and a request for accessing url_a may have been shifted to any one of cache servers 2-4 during the time when cache server 1 was in a "down" status, a next cache server needs to be obtained, and blocks, starting from block 503, are repeated for that cache server.

At 509, the process determines whether a next cache server may be mapped from the present cache server. If affirmative, the process goes to block 510; otherwise, the process is ended.

At 510, the process maps from the present cache server to the next cache server that is next in an order and returns to block 503.

As can be seen, the exemplary purge agent uses the same consistent Hashing algorithm of the dispatcher and with the help of status change information of cache servers, precisely locate a cache server where the object to be removed exists. Because the object can be removed precisely and completely without requiring removal operations be performed in all cache servers, this embodiment reduces the amount of system resource that will be occupied due to performing the removal operations in all cache servers of the system as compared with existing technology.

Figure 6:
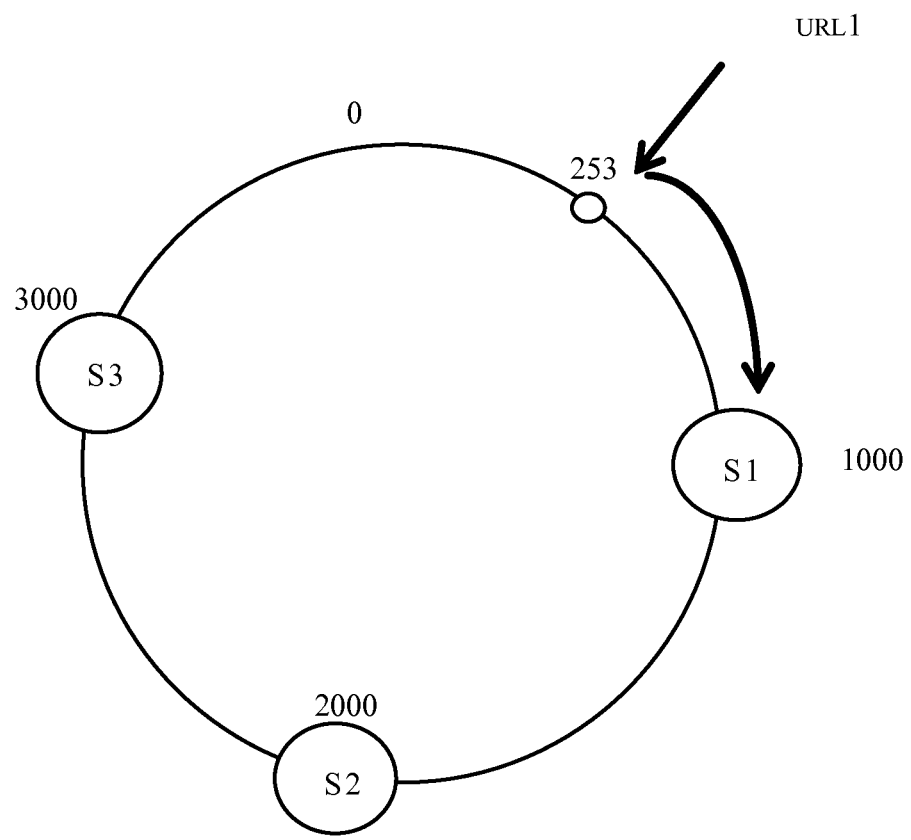
FIG. 6 shows a schematic diagram illustrating an example use of a consistent Hashing ring in accordance with an embodiment of the present disclosure.

With reference to FIG. 6, an implementation of the exemplary embodiments will be described using an example of removing a malicious image from a distributed image cache system.

Let a distributed cache system include three cache servers, S1, S2 and S3 respectively. Each cache server is identified by a respective IP address which acts as a respective identifier. A designated Hash function hash_function_x is applied to hash the IP addresses of S1, S2 and S3 separately. If respective Hash values so obtained are three integers, namely 1000, 2000 and 3000, these three cache servers are mapped onto the ring at positions as shown in FIG. 6. Let a status table showing initial status of these three cache servers be Table 1, in which Last_stamp represents a time stamp at which the last status change of a cache server occurs, and Current_status represents the current status of the cache server.

TABLE 1

| Server | S1 | S2 | S3 |
|---|---|---|---|
| Last_stamp | 0 | 0 | 0 |
| Current_status | Up | Up | Up |

In Table 1, respective Last_stamp of S1, S2 and S3 are "0" initially, indicating that time stamps of S1, S2 and S3 are all zero initially. A time stamp may be recorded in a unit of "day". For example, an initial start-up occurs in Day 1 with time stamp being "0". The value of the time stamp increments by one in each day. Current_status being "UP" indicates that S1, S2 and S3 are initially in an active status. Current_status being "DOWN" indicates that associated server is down.

A user may want to access the object resource url_1 at time 1, for example. Upon applying the Hash function hash_function_x to url_a to obtain a Hash value of 253, the Hash value is mapped onto the ring as shown in FIG. 6. Starting from a position at which the Hash value of 253 has been mapped and searching in a clockwise direction, the first cache server found is S1. Accordingly, the request for accessing the object resource url_1 will be processed by S1. If the user accesses url_1 through S1 for the first time, S1 obtains the object resource url_1 from a source data server, stores url_1, and returns url_1 to the user.

If S1 is down at time 2, the status table of the cache servers is updated as shown in Table 2.

TABLE 2

| Server | S1 | S2 | S3 |
|---|---|---|---|
| Last_stamp | 2 | 0 | 0 |
| Current_status | DOWN | Up | Up |

In Table 2, Current_status of S1 is "DOWN", indicating that the status after the latest status change of S1 is "down", i.e., S1 is currently in a "down" status. Last_stamp changes from "0" to "2", indicating that the time stamp is "2" when S1 becomes "down". The time duration of S1 in the "down" status is the difference between the time stamp at present time and the time stamp "2".

Assume that the user wants to access the object resource url_1 again at time 3. A Hash value of 253 for url_1 is obtained by applying the Hash function hash_function_x. Starting from a position at which the Hash value of 253 has been mapped and searching in a clockwise direction, the first cache server found is S1. As S1 is found to be down from the status table (Table 2), a next cache server on the ring, S2 (which is currently in an active status), is obtained by searching in a clockwise direction starting from S1. Accordingly, the request for accessing the object resource url_1 will be processed by S2. At that time, the object resource url_1 is cached in both S1 and S2.

Let the object resource url_1 be detected as a malicious image at time 4. url_1 is therefore needed to be removed from the distributed cache system. A system administrator may send a removal request to the purge agent using a standard HTTP Post method. The removal request includes url_1 as a target to be removed.

In response to receiving the removal request, the purge agent reads url_1, the target to be removed, and obtains the Hash value of url_1 as 253 through the Hash function hash_function_x. The purge agent maps the Hash value of 253 onto the ring as shown in FIG. 6, and starting from a position at which the Hash value of 253 is mapped, finds the first cache server. The purge agent further examines the status table and finds that S1 has been down since time 2 and therefore cannot remove url_1 that is stored in S1 at that time. The purge agent adds S1 and corresponding url_1 into a deferred removal list, and waits until S1 is resumed to remove url_1. The purge agent subsequently finds S2 by beginning a search from S1 in a clockwise direction along the ring. The purge agent further examines the status table and finds that S2 is currently in an active status. Therefore, the purge agent sends the removal request to S2 which finds and removes the malicious image stored therein (i.e., url_1) based on the removal request. Since S2 has not been down in the past, the removal operation is completed.

Corresponding to the exemplary methods of removing a distributed caching object, the present disclosure further provides exemplary systems and servers of removing a distributed caching object.

Figure 7:
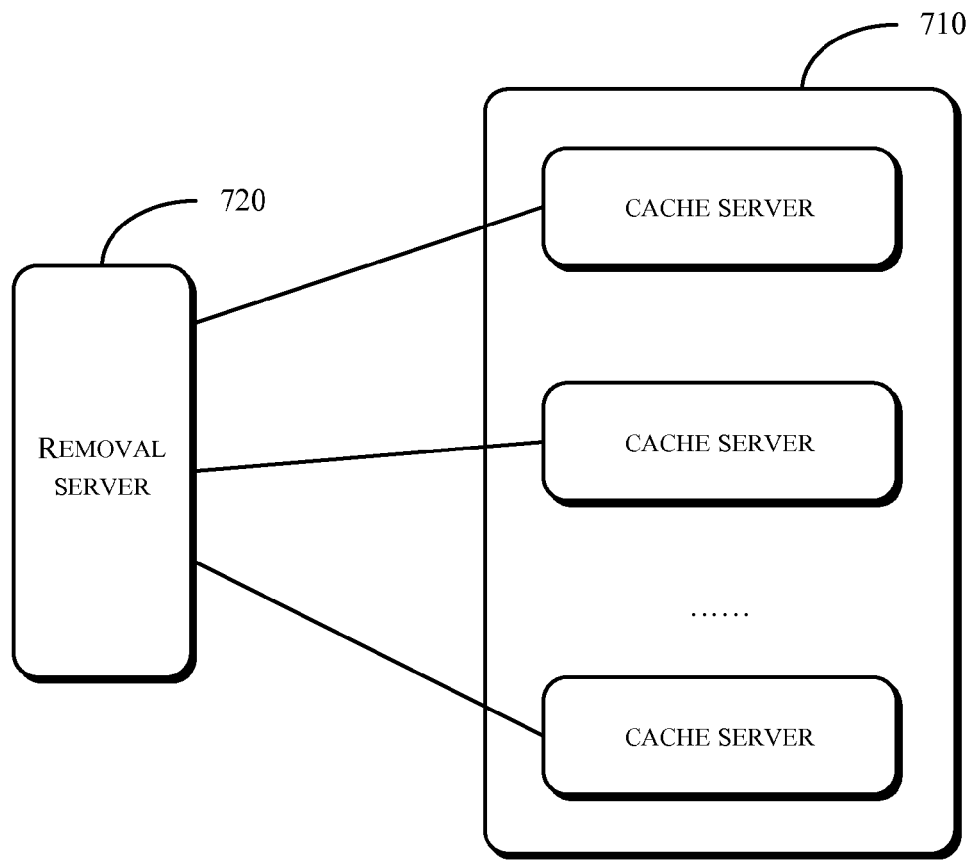
FIG. 7 shows a block diagram illustrating an exemplary system of removing a distributed caching object.

FIG. 7 shows a block diagram illustrating an exemplary system of removing of a distributed caching object.

The system includes multiple cache servers 701 and a removal server 702. The multiple cache servers 701 are configured to cache objects that are accessed by users. The removal server 702 is configured to receive a removal request. The removal request may include an identifier of an object. The removal server 702 may be further configured to apply consistent Hashing to the identifier of the object to obtain a Hash result value of the identifier. In one embodiment, the removal server 702 may locate a corresponding cache server based on the Hash result value and render the corresponding cache server to be a present cache server, and determine whether the present cache server is in an active status and has an active period greater than an expiration period associated with the object. In response to determining that the present cache server is in an active status and has an active period greater than the expiration period associated with the object, the removal server 702 may remove the object from the present cache server.

Furthermore, in response to determining that the active period is less than the expiration period, the removal server 702 is further configured to remove the object from the present cache server, shift from the present cache server to a next cache server in an order, render the next cache server as the present cache server, and return to the act of determining whether the present cache server is in an active status and has an active period greater than the expiration period of the object.

The removal server 702 may further be configured to determine whether the active period of the present cache server is greater than the expiration period of the object if the present cache server is in inactive status, shift from the present cache server to a next cache server in an order and render the next cache server as the present cache server if the inactive period is greater than the expiration period, and return to the act of determining whether the present cache server is in an active status and has an active period greater than the expiration period of the object.

The removal server 702 may further be configured to record the identifier if the inactive period is not greater than the expiration period, perform the act of shifting from the present cache server to a next cache server, and remove the object based on the recorded identifier after the present cache server is resumed to an active status.

The removal server 702 may further be configured to set up a status table of cache servers, and store a time stamp of the last status change of each cache server and a current status of each cache server in the status table. The time stamp is used for determining a time duration about how long corresponding cache server is in the current status.

Figure 8:
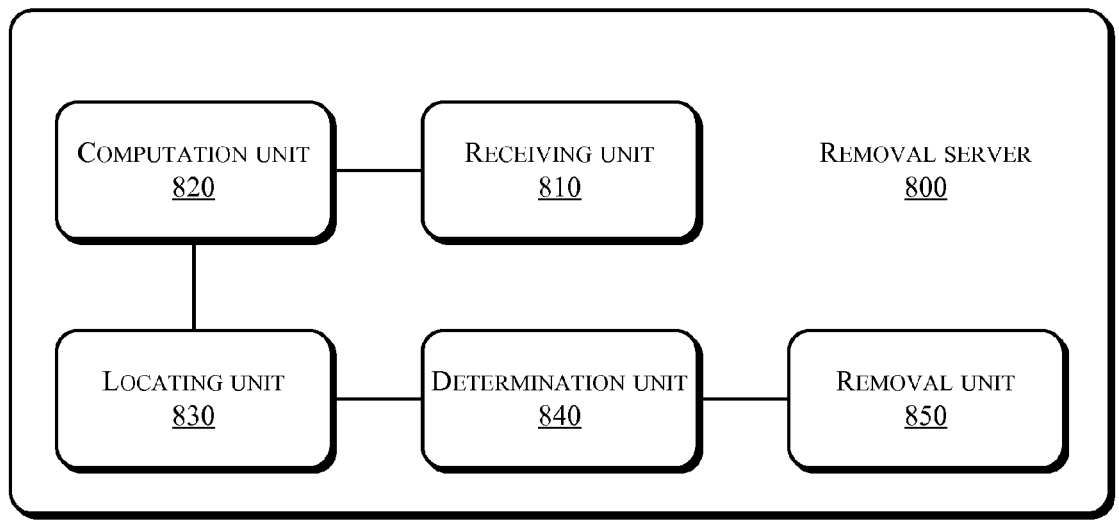
FIG. 8 shows a block diagram illustrating a first removal server.

FIG. 8 shows a block diagram illustrating a first removal server 800. The removal server 800 includes a receiving unit 810, a computation unit 820, a locating unit 830, a determination unit 840 and a removal unit 850.

The receiving unit 810 is configured to receive a removal request, where the removal request includes an identifier of an object.

The computation unit 820 is configured to apply consistent Hashing to the identifier of the object to obtain a Hash result value of the identifier.

The locating unit 830 is configured to locate a corresponding cache server based on the Hash result value and render the corresponding cache server to be a present cache server.

The determination unit 840 is configured to determine whether the present cache server is in an active status and has an active period greater than an expiration period associated with the object.

The removal unit 850 is configured to remove the object from the present cache server in response to determining that the present cache server is in an active status and has an active period greater than the expiration period associated with the object.

Figure 9:
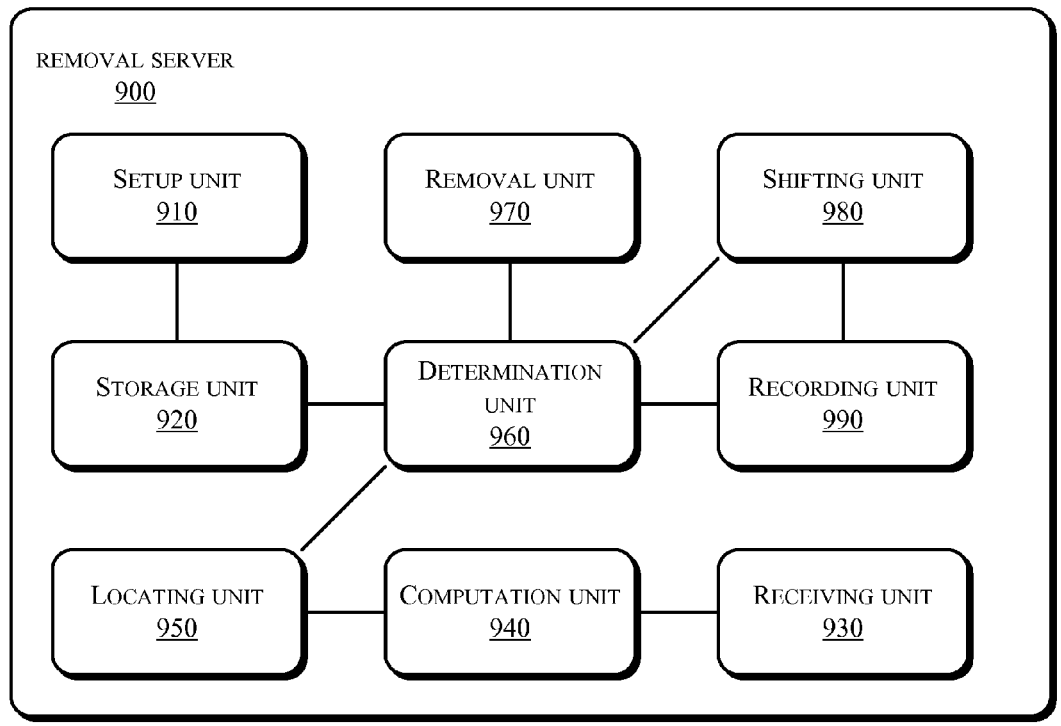
FIG. 9 shows a block diagram illustrating a second removal server.

FIG. 9 shows a block diagram illustrating a second removal server 900. The removal server 900 includes a setup unit 910, a storage unit 920, a receiving unit 930, a computation unit 940, a locating unit 950, a determination unit 960, a removal unit 970, a shifting unit 980 and a recording unit 950.

The setup unit 910 is configured to set up a status table of cache servers.

The storage unit 920 is configured to store a time stamp of the last status change of each cache server and a current status of each cache server in the status table, where the time stamp is used for determining a time duration about how long corresponding cache server is in the current status.

The receiving unit 930 is configured to receive a removal request, where the removal request includes an identifier of an object.

The computation unit 940 is configured to apply consistent Hashing to the identifier of the object to obtain a Hash result value of the identifier.

The locating unit 950 is configured to locate a corresponding cache server based on the Hash result value and render the corresponding cache server as a present cache server.

The determination unit 960 is configured to determine whether the present cache server is in an active status and has an active period greater than an expiration period of the object.

The removal unit 970 is configured to remove the object from the present cache server in response to determining that the present cache server is in an active status and has an active period greater than the expiration period of the object.

The removal unit 970 is further configured to remove the object from the present cache server in response to determining that the active period is less than the expiration period.

The shifting unit 980 is configured to shift from the present cache server to a next cache server, render the next cache server as the present cache server, and trigger the determination unit 960.

The determination unit 960 is further configured to determine whether an inactive period of the present cache server is greater than the expiration period of the object if the present cache server is in an inactive status.

If the inactive period of the present cache server is greater than the expiration period, the shifting unit 980 is further configured to shift from the present cache server to a next cache server, render the next cache server as the present cache server, and trigger the determination unit 960.

The recording unit 990 is configured to record the identifier and trigger the shifting unit 980 if the inactive period is not greater than the expiration period.

The removal unit 970 is further configured to remove the object based on the recorded identifier after the present cache server returns to an active status.

From the above description of exemplary implementations, the exemplary embodiments of the present disclosure receive a removal request which includes an identifier of an object, apply consistent Hashing to the identifier of the object to obtain a Hash result value of the identifier, locate a corresponding cache server based on the Hash result value, render the corresponding cache server to be a present cache server, determine whether the present cache server is in an active status and has an active period greater than an expiration period associated with the object, and remove the object from the present cache server in response to determining that the present cache server is in the active status and has the active period greater than the expiration period associated with the object. The exemplary embodiments of the present disclosure therefore do not need to perform removal operations in all cache servers. Instead, by comparing an active period of a located cache server with an expiration period associated with an object, the exemplary embodiments precisely locate a cache server that includes the object to be removed and perform a removal operation, thus saving the other cache servers from wasting resources to perform removal operations and hence improving the overall performance of the distributed cache system.

From the exemplary embodiments described above, one skilled in the art can clearly understand that the disclosed method and system may be implemented using software with essential universal hardware platform. Based on this understanding, the technical scheme of the present disclosure or existing technology may be implemented in the form of software products which are stored in a non-volatile storage media, e.g., ROM/RAM, disk, or compact disc. The software includes instructions for a computing device (e.g., a personal computer, a server or a networked device) to execute the method described in the exemplary embodiments or certain parts of the exemplary embodiments in the present disclosure.

The various exemplary embodiments are progressively described in the present disclosure. Same or similar portions of the exemplary embodiments can be mutually referenced. Each exemplary embodiment has a different focus than other exemplary embodiments. In particular, the exemplary system has been described in a relatively simple manner because of its fundamental correspondence with the exemplary method. Details thereof can be referred to related portions of the exemplary method.

The disclosed method and system may be used in an environment or in a configuration of universal or specialized computer system(s). Examples include a personal computer, a server computer, a handheld device or a portable device, a tablet device, a multi-processor system, a microprocessor system, a set-top box, programmable consumer electronics, a network PC, a micro-computer, a macro-computer, and a distributed computing environment including any system or device above.

The disclosed method and system can be described in the general context of computer-executable instructions, e.g., program modules. Generally, the program modules can include routines, programs, objects, components, data structures, and the like that perform particular functions or implement particular abstract data types. The disclosed method and system can also be practiced in a distributed computing environment where functions are performed by remote processing devices that are linked through a communication network. In a distributed computing environment, the program modules may be located in local and/or remote computer storage media, including memory storage devices.

Figure 10:
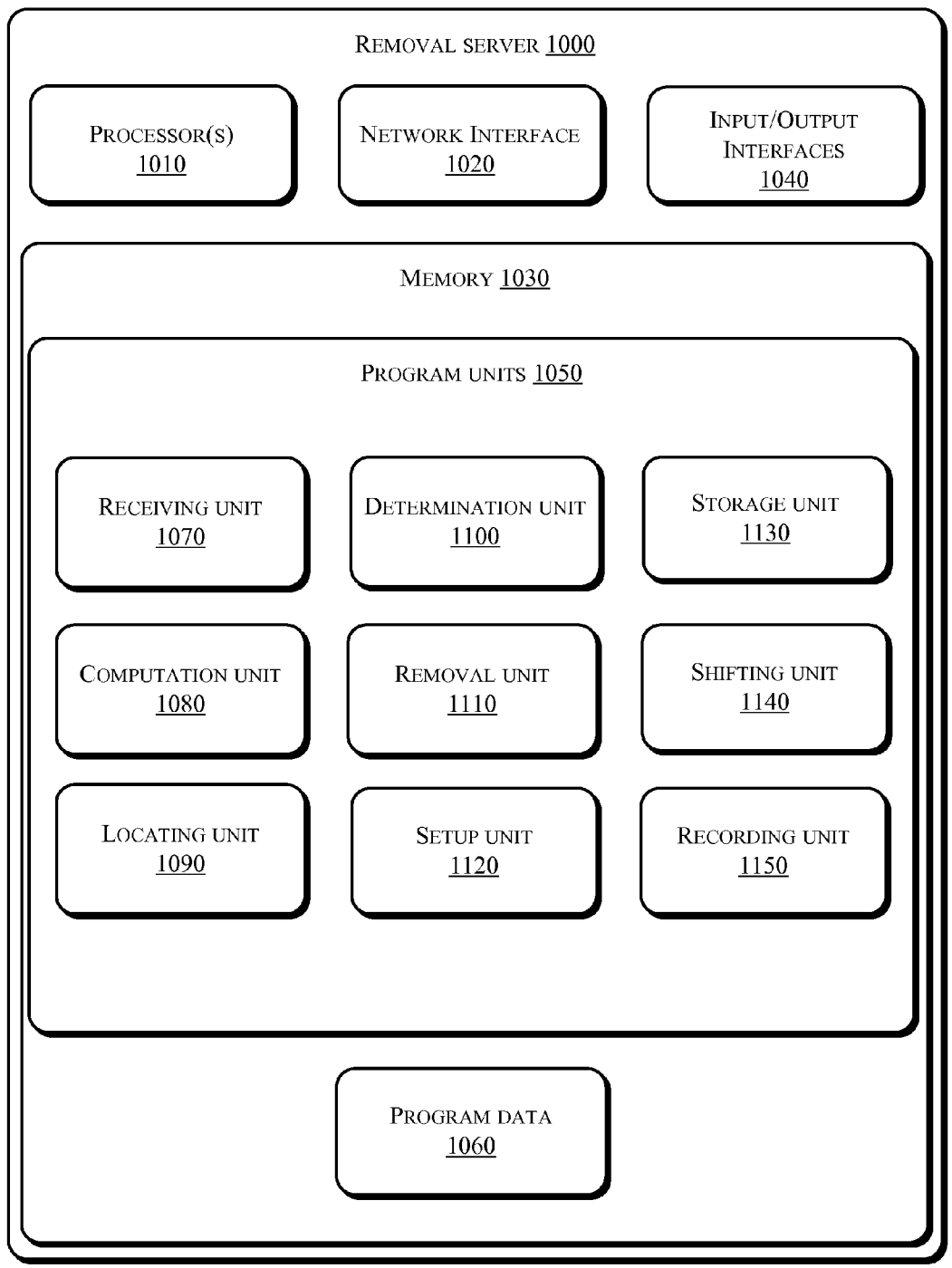
FIG. 10 shows the exemplary removal server described in FIG. 8-9 in more detail.

For example, FIG. 10 illustrates an exemplary removal server 1000, such as the server as described above, in more detail. In one embodiment, the server 1000 can include, but is not limited to, one or more processors 1010, a network interface 1020, memory 1030, and an input/output interface 1040.

The memory 1030 may include computer-readable media in the form of volatile memory, such as random-access memory (RAM) and/or non-volatile memory, such as read only memory (ROM) or flash RAM. The memory 1030 is an example of computer-readable media.

Computer-readable media includes volatile and non-volatile, removable and non-removable media implemented in any method or technology for storage of information such as computer readable instructions, data structures, program modules, or other data. Examples of computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media such as modulated data signals and carrier waves.

The memory 1030 may include program units 1050 and program data 1060. In one embodiment, the program units 1050 may include a receiving unit 1070, a computation unit 1080, a locating unit 1090, a determination unit 1100 and a removal unit 1110. Additionally, in some embodiments, the program units 1050 may further include a setup unit 1120 and a storage unit 1130. Additionally or alternatively, the program units 1050 may include a shifting unit 1140 and a recording unit 1150. Details about these program units may be found in the foregoing embodiments described above.

Although exemplary embodiments are used to describe the present disclosure, an ordinary person in the art should understand that the present disclosure can be altered or modified in many different ways without departing from the spirit and the scope of this disclosure. Accordingly, it is intended that the present disclosure covers all modifications and variations which fall within the scope of the claims of the present disclosure and their equivalents.

What is claimed is:

1. A method comprising:
receiving a request for removing an object;
determining whether a server is in an active status and an active period of the server is greater than an expiration period associated with the object; and
in response to determining that the server is in the active status and the active period of the server is greater than the expiration period associated with the object, removing the object from the server.

2. The method as recited in claim 1, further comprising:
in response to determining that the active period is less than the expiration period, removing the object from the server; and
shifting from the server to a next server; and
determining whether the next server is in the active status and an active period of the next server is greater than the expiration period associated with the object.

3. The method as recited in claim 1, further comprising:
if the server is in an inactive status, determining whether an inactive period of the server is greater than the expiration period of the object.

4. The method as recited in claim 3, further comprising:
if the inactive period is greater than the expiration period, shifting from the server to a next server; and
determining whether the next server is in the active status and an active period of the next server is greater than the expiration period associated with the object.

5. The method as recited in claim 3, further comprising:
if the inactive period is not greater than the expiration period, recording an identifier of the server and shifting to a next server.

6. The method as recited in claim 5, further comprising:
after the server having the recorded identifier is resumed to the active status, removing the object from the server having the recorded identifier based at least in part on the recorded identifier.

7. The method as recited in claim 1, further comprising setting up a status table of servers in advance.

8. The method as recited in claim 1, further comprising storing a time stamp of a last status change of the server and a current status of the server in a status table, the time stamp being used for determining a time duration of the current status of the server.

9. A system comprising a removal server stored in memory and executable by one or more hardware processors, the removal server configured to:
receive a request for removing an object,
determine whether a first server is in an active status and an active period of the first server is greater than an expiration period associated with the object, and
remove the object from the first server in response to determining that the first server is in the active status and the active period of the first server is greater than the expiration period associated with the object.

10. The system as recited in claim 9, wherein in response to determining that the active period is less than the expiration period, the removal server is further configured to remove the object from the first server, shift from the first server to a second server, and determine whether the second server is in the active status and an active period of the second server is greater than the expiration period of the object.

11. The system as recited in claim 9, wherein the removal server is further configured to determine whether an inactive period of the first server is greater than the expiration period of the object if the first server is in an inactive status, shift from the first server to a second server if the inactive period is greater than the expiration period, and determine whether the second server is in the active status and an active period of the second server is greater than the expiration period of the object.

12. The system as recited in claim 11, wherein the removal server is further configured to record an identifier of the first server if the inactive period is not greater than the expiration period, and remove the object from the first server based on the recorded identifier after the first server is resumed to the active status.

13. The system as recited in claim 9, wherein the removal server is further configured to set up a status table of servers.

14. The system as recited in claim 9, wherein the removal server is further configured to store a time stamp of a last status change of the first server and a current status of the first server in a status table, and wherein the time stamp is used for determining a time duration of how long the first server is in the current status.

15. One or more non-transitory media storing executable instructions that, when executed by one or more hardware processors, cause the one or more hardware processors to perform acts comprising:
receiving a request for removing an object,
determining whether a first server is in an active status and an active period of the first server is greater than an expiration period associated with the object, and
removing the object from the first server in response to determining that the first server is in the active status and the active period of the first server is greater than the expiration period associated with the object.

16. The one or more non-transitory media as recited in claim 15, the acts further comprising:
in response to determining that the active period is less than the expiration period,
removing the object from the first server,
shifting from the first server to a second server, and determining whether the object is to be removed from the second server based at least in part on whether the second server is in the active status and an active period of the second server is greater than the expiration period of the object.

17. The one or more non-transitory media as recited in claim 15, the acts further comprising:
determining whether an inactive period of the first server is greater than the expiration period of the object if the first server is in an inactive status;
shifting from the first server to a second server if the inactive period is greater than the expiration period, and determining whether the object is to be removed from the second server based at least in part on whether the second server is in the active status and an active period of the second server is greater than the expiration period of the object.

18. The one or more non-transitory media as recited in claim 15, the acts further comprising:
recording an identifier of the first server if the inactive period is not greater than the expiration period.

19. The one or more non-transitory media as recited in claim 18, the acts further comprising:
removing the object from the first server based on the recorded identifier after the first server is resumed to the active status.

20. The one or more non-transitory media as recited in claim 15, the acts further comprising:
storing a time stamp of a last status change of the first server and a current status of the first server in a status table, and wherein the time stamp is used for determining a time duration of how long the first server is in the current status.

* * * * *